3,415,907
MIXED TRIARYL PHOSPHITES WHEREIN ONE OR TWO OF THE ARYL RADICALS CONTAINS A BENZYL OR α-ALKYLBENZYL SUBSTITUENT
James S. Sconce, Lewiston, James J. Hodan, Williamsville, and William L. Schall, Buffalo, N.Y., assignors to Hooker Chemical Corporation, Niagara Falls, N.Y., a corporation of New York
No Drawing. Filed May 24, 1965, Ser. No. 458,473
15 Claims. (Cl. 260—967)

This invention relates to novel mixed organic phosphites. More particularly, it relates to mixed triaryl phosphites in which at least one and not more than two aryl radicals contain at least one benzyl or α-alkylbenzyl substituent.

Heretofore, various organic phosphorus compounds have been employed as stabilizers for polymeric compositions of the type exemplified by polyvinyl chloride, rubber and the like. However, the phosphorus compounds employed often have had serious limitations. For example, usually they tended to hydrolyze upon exposure to moisture, resulting in discoloration and undesirable odor generation.

It is an object of this invention to provide novel mixed organic phosphites which possess improved stabilizing properties. Other objects of the invention will be apparent from the following detailed description.

In accordance with the practice of the invention, it has been discovered that the hereinbefore referred to object can be accomplished by the novel compounds of the invention. These may be prepared by reacting a phosphorus trihalide with 1 to 2 molar proportions of a substituted phenol carrying one or more substituents selected from the group consisting of alkyl, benzyl, α-alkylbenzyl and halogen, molar proportions being based on weight of phosphorus trihalide employed, adding to the reaction mixture sufficient molar proportions of a hydroxy compound selected from the group consisting of phenol, alkyl-substituted phenol and halo-substituted phenol, so that the molar proportions of substituted phenol to phosphorus halide and hydroxy compound to phosphorus halide add up to at least 3, and thereafter separating the desired phosphite from the reaction mixture. The term "hydroxy compound" is used herein and in the appended claims to describe a group of the phenolic reactants employed in the process of this invention, namely, phenol, alkyl-substituted phenol and halo-substituted phenol.

The novel mixed organic phosphites of the invention are characterized by the structural formula:

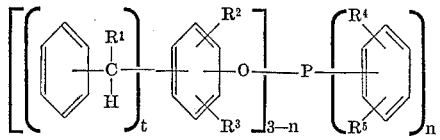

wherein $R^1$ is selected from the group consisting of hydrogen and alkyl of 1 to 8 carbon atoms, preferably of 1 to 4 carbon atoms, $R^2$, $R^3$, $R^4$ and $R^5$ are independently selected from the group consisting of hydrogen, alkyl of 1 to 18 carbon atoms, preferably of 1 to 12 carbon atoms, most preferably of 1 to 9 carbon atoms and halogen, of which chlorine is most preferred, $n$ is from 1 to 2, and $t$ is from 1 to 3. $R^2$, $R^3$, $R^4$ and $R^5$ may be the same or different.

Illustrative examples of the novel organic phosphites which can be prepared by the process of this invention are the following:

phenyl bis (4-α-methylbenzylphenyl) phosphite
phenyl bis(2-α-methylbenzylphenyl) phosphite
tolyl bis(4-α-methylbenzylphenyl) phosphite
xylyl bis(2-α-methylbenzylphenyl) phosphite
phenyl bis[2,4-di(α-methylbenzyl) phenyl] phosphite
tolyl bis[2,6-di(α-methylbenzyl) phenyl] phosphite
phenyl bis[2,4,6-tri(α-methylbenzyl) phenyl] phosphite
tolyl bis[2,4,6-tri(α-methylbenzyl) phenyl] phosphite
phenyl bis (2-α-methylbenzyl-4-chlorophenyl) phosphite
phenyl bis(2α-methylbenzyl-4-cresyl) phosphite
nonylphenyl bis(4-α-methylbenzylphenyl) phosphite
nonylphenyl bis [2,4-di(α-methylbenzyl) phenyl] phosphite
nonylphenyl bis[2,4,6-tri(α-methylbenzyl) phenyl] phosphite
diphenyl 4-α-methylbenzylphenyl phosphite
ditolyl 2-α-methylbenzylphenyl phosphite
dixylyl 2,4-di(α-methylbenzyl) phenyl phosphite, and the like.

As the substituted phenols there may be employed compounds of the structural formula:

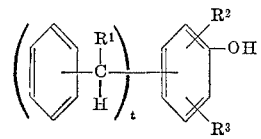

wherein $R^1$, $R^2$, $R^3$ and $t$ are as previously described. Typical illustrative examples of the compounds characterized by the above formula are the following: benzyl phenol; 4-α-methylbenzyl phenol; 2-α-methylbenzyl phenol; 2,4-di(α-methylbenzyl) phenol; 2,4,5-tri(α-methylbenzyl) phenyl; 2-α-methylbenzyl-4-chlorophenol; 2-α-methylbenzyl-4-methyl phenol; 2-α-methylbenzyl-4-nonyl phenol; and the like.

As the hydroxyl compounds there may be employed those of the structural formula:

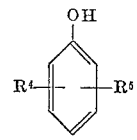

wherein $R^4$ and $R^5$ are as previously described. Illustrative examples of the compounds characterized by the above formula are the following: phenol; O-cresol; m-cresol; p-cresol; 2,6-xylenol; 2,5-xylenol; 2,4-xylenol; hexyl phenol; nonyl phenol; decyl phenol; O-chlorophenoyl; m-chlorophenol; p-chlorophenol; O-bromophenol; m-bromophenol; p-bromophenol; and the like.

As the phosphorus trihalide reactant of the present invention, there can be used compounds, such as phosphorus tribromide, phosphorus trichloride and phosphorus trifluoride. Of these, phosphorus trichloride is most preferred.

In conducting the reaction, the phosphorus trihalide is charged to a reaction vessel initially and the other reactants, namely, the substituted phenol and hydroxy compound, are added progressively during the course of the reaction. Usually, the reactants are introduced in desired molar proportions, based upon the weight of phosphorus trihalide employed. In practice, a stoichiometric quantity of up to two molar proportions of substituted phenol is added to the phosphorus trihalide, the number of molar proportions employed depend upon the extent of substitution desired. Thereafter, quantities of up to 10 molar proportions of hydroxy compound may be added to complete the substitution. Generally, however, 1 to 2 molar proportions are employed. It is to be noted that preferably the substituted phenol and hydroxy compound are employed in molar proportions which add up to 3, but it is within the scope of the invention to employ excess hydroxy compound. When such an excess is employed, it may be removed by any suitable method such as distillation or the like.

Accordingly, when a diaryl α-alkylbenzylphenyl phosphite is desired, the α-alkylbenzylphenol is reacted in substantially 1 molar proportion based on phosphorus trihalide employed, and the hydroxy compound is reacted in substantially 2 molar proportions on the same basis.

It is also within the scope of the invention first to prepare and separate the phosphorohalidite reaction product produced by the reaction of phosphorus halide and substituted phenol, and thereafter react said product with the hydroxy compound.

Reaction temperatures of from about 20 degrees centigrade to 250 degrees centigrade or more can be employed, the preferred temperatures usually being from about 20 degrees centigrade to 200 degrees centigrade. Conveniently, the hydrochloride by-product formed during the reaction may be eliminated at the temperatures hereinbefore mentioned. Reaction times of from as little as about 3 to about 12 hours are in most cases sufficient for completion of the reaction.

If desired, a metallic chloride, such as magnesium chloride, aluminum chloride, zinc chloride and mixtures thereof, may be employed to increase the rate of reaction. When this is done, metallic chloride may be used in percentages ranging from 0.1 to 5.0 percent, based on the weight of phosphorus trihalide employed. Further, the rate of reaction may also be increased by employing elevated reaction temperatures, super-atmospheric pressures, or combinations of both. Generally, temperatures ranging from 200 degrees centigrade to 250 degrees centigrade and pressures ranging from over 1 atmosphere to 5 atmospheres are sufficient to produce the desired increase in the rate of reaction.

When the reaction is completed, the desired product can be recovered by conventional techniques, such as distillation, extraction, crystallization and the like. However, due to the high yields obtainable in many cases, especially when, as previously described, the stoichiometric proportions of hydroxy compound and substituted phenol employed in the reaction add up to 3, separation of the desired phosphite from the reaction mixture is not always required for utility of the product and in such cases may be omitted.

The compounds which are provided in accordance with this invention find particular utility as new and useful stabilizers for compositions such as polyvinyl chloride, rubber and oils.

The following examples are presented to illustrate the novel compounds of this invention and their preparation. It is to be understood that the examples are not to be construed as limiting the invention except as defined in the appended claims. All temperatures are in degrees centigrade and all parts are by weight, unless otherwise mentioned.

Example 1.—Preparation of diphenyl α-methylbenzylphenyl phosphite

A reaction vessel was charged with 1,587 parts of phosphorus trichloride and to this were added 495 parts of α-methylbenzylphenol with stirring. The pot temperature was maintained at 22–23 degrees centigrade during the addition and thereafter the temperature was raised to reflux the excess phosphorus trichloride. After 12 hours of refluxing, the excess PCl₃ was distilled out and the α-methylbenzylphenyl phosphorodichloridite distilled at a vapor temperature of 134–139 degrees centigrade and 0.5 millimeter of absolute pressure. The purity of the product was 95 percent, as determined by active chlorine analysis. A portion of this product (540 parts) was then added to a pot containing 435 parts of hot phenol (30 percent excess) with stirring. The reaction was maintained at 50 degrees centigrade until hydrogen chloride evolution ceased. Thereafter, the temperature was raised to 100 degrees and vacuum applied to distill off the excess phenol.

The residual product was found to contain 7.38 percent of phosphorus. The calculated percentage of phosphorus in $C_{26}H_{23}O_3P$ is 7.47 percent. Infrared analysis of the diphenyl α-methylbenzylphenyl phosphite produced was consistent with that formula for points of structure such as aryl oxygen phosphorus bond and methyl to carbon bond.

Example 2.—Preparation of mixed phenyl 2,4,6-tri (α-methylbenzyl) phenyl phosphite having the structural formula

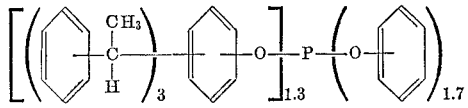

A reaction vessel equipped with a mechanical stirrer, thermometer, heating mantle, addition funnel, Vigreaux column, distillation head, condenser and receiver was charged with 1,050 parts of phosphorus trichloride and 1 part of magnesium chloride. The mixture was heated to 60 degrees centigrade and 661 parts of 2,4,6-tri(α-methylbenzyl) phenol were added. This mixture was then refluxed for 57 hours and the unreacted phosphorus trichloride was distilled off to a pot temperature of 140 degrees centigrade. The residual product, through active chlorine determination, was identified as a phosphorodichloridite having the following formula

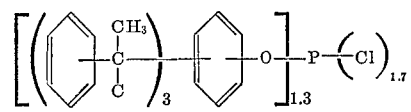

a mixture of bis[2,4,6-tri(α-methylbenzyl) phenyl] phosphorochloridite and 2,4,6-tri(α-methylbenzyl) phenyl phosphorodichloridite.

668 parts of the above-identified compound were reacted with 386 parts of phenol. The mixture was heated and maintained between 100 degrees centigrade to 135 degrees centigrade for 9 hours, whereupon hydrogen chloride evolution ceased. Excess phenol was stripped off at 116 degrees centigrade and 22 millimeters of mercury, absolute pressure. The residual product was found to contain 3.38 percent of phosphorus. The calculated percentage of phosphorus in the mixture of diphenyl 2,4,6-tri (α-methylbenzyl) phenyl phosphite and phenyl bis[2,4,6-tri(α - methylbenzyl)phenyl] phosphite is 4.26 percent. However, an infrared scan showed that 20 percent phenol remained in the product thus giving a calculated percentage of 3.41 percent phosphorus. Additionally, the infrared scan of the mixture of phosphites described above was consistent with the description given above for points of structure, such as aryl oxygen phosphorus bond and methyl carbon bond.

Example 3.—Preparation of phenyl bis(α-methylbenzylphenyl) phosphite from a mixed α-methylbenyl phenol The apparatus for Example 2 was charged with 137.5 parts of phosphorus trichloride and 1 part of anhydrous magnesium chloride. The charge was heated to 60 degrees centigrade and 451.4 parts of α-methylbenzyl phenol were added thereto. Pot temperature was maintained at 60 degrees centigrade for one hour, followed by refluxing for 16 hours. Thereafter the reaction mixture was cooled to 60 degrees centigrade and 94 parts of phenol were added. The reaction mixture was maintained at 60 degrees centigrade for one hour and was raised to 180 degrees centigrade for 2 hours, whereupon hydrogen chloride evolution ceased. Excess phenol was removed, employing water aspirator vacuum. The residual compound was found to contain 5.34 percent of phosphorus. The calculated percentage of the element in the product, identified below, is 5.41 percent phosphorus. The product is a new compound having the formula:

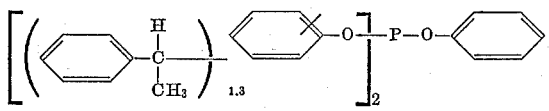

Thus, it is a mixture of phenyl bis[mono(α-methylbenzyl) phenyl] phosphite and phenyl bis[di(α-methylbenzyl) phenyl] phosphite in a 2:1 ratio. The infrared scan of the above mixture was consistent with the structural formula given above for points of structure, such as aryl oxygen phosphorus bond and methyl to carbon bond.

Example 4.—Preparation of di(nonylphenyl)-2,4-di(α-methylbenzyl) phenyl phosphite The apparatus of Example 2 was charged with 137.5 parts of phosphorus trichloride and 1 part of anhydrous magnesium chloride. The vessel was heated to 60 degrees centigrade and 300 parts of 2,4-di(α-methylbenzyl) phenol were added. Thereafter, the mixture was maintained for one hour at 60 degrees centigrade, followed by refluxing for 10 hours. After cooling the reaction mixture to 60 degrees centigrade, there were added 222 parts of p-nonyl phenol. The reaction mixture was maintained at 60 degrees centigrade for one hour and raised to 180 degrees centigrade for 2 hours, whereupon hydrogen chloride evolution ceased. The unreacted nonyl phenol was stripped off under high vacuum. The residual compound was found to contain 4.08 percent phosphorus. The calculated percentage of element in $C_{52}H_{67}O_3P$ is 4.02 percent phosphorus. Infrared analysis of the product was consistent with di(nonylphenyl) 2,4 - di(α - methylbenzyl) phenyl phosphite for points of structure such as aryl oxygen phosphorus bond and methyl to carbon bond.

On substitution of equimolar quantities of the compounds 2 - α - methylbenzyl phenol, benzyl phenol, 2 - α - methylbenzyl - 4 - methyl phenol, 2 - α - methylbenzyl - 4 - chlorophenol, 2-α-methylbenzyl-4-nonylphenol, or 2,4,6-tri(α-methylbenzyl) phenol for 2,4 - di(α-methylbenzyl) phenol, the corresponding phosphites are obtained.

Example 5.—Preparation of phenyl bis[2,4,6-tri(α-methylbenzyl) phenyl] phosphite The apparatus of Example 2 was charged with 927 parts of 2,4,6-tri(α-methylbenzyl) phenol and 180 parts of phosphorus trichloride. The vessel was heated until hydrogen chloride evolution ceased. Evolution started at 75 degrees centigrade and was completed after a 12 hour reacting period at 200 degrees centigrade. Upon cooling the reaction mixture to 50–60 degrees centigrade, 298 parts (200% excess) of phenol were added thereto. The temperature was maintained at 50–60 degrees centigrade, and eventually raised to 160 degrees centigrade to ensure completion of the reacation. Thereafter, vacuum was applied to remove the excess phenol. The residual compound was found to contain 3.31 percent of phosphorus. The calculated percentage of the element in $C_{66}H_{63}O_3P$ is 3.3 percent phosphorus. Infrared analysis verified the compound to be phenyl bis[2,4,6-tri(α-methylbenzyl) phenyl] phosphite.

Upon replacement of the 2,4,6 - tri(α - methylbenzyl) phenol by equimolar quantities of 2,4-di(α-methylbenzyl) phenol, α - methylbenzyl phenol, 2 - α - methylbenzyl - 4 - chlorophenol or 2 - α - methylbenzyl-4-methyl phenol, the corresponding phosphites are obtained.

As previously stated, the novel compounds of the invention are useful as stabilizers for synthetic rubber and chlorinated polymers. They can, for example, be used for stabilizing (a) polymers derived from conjugated diolefines, such as butadiene, dimethyl butadiene, isoprene and homologues thereof; (b) copolymers of conjugated diolefines and polymerizable vinyl compounds, such as styrene, α-methyl styrene, acrylonitrile, methacrylonitrile, acrylates of methacrylates; (c) copolymers derived from iso-olefines (e.g. isobutylene or its homologues) and small quantities of conjugated diolefines; and (d) polymers derived from chlorobutadiene, and (e) copolymers of chlorobutadiene with mono-olefines and/or diolefines of polymerizable vinyl compounds. Examples of chlorine-containing polymers are polymers of vinyl chloride or vinylidene chloride and copolymers of these compounds with 2-chlorobutadiene or vinyl acetate, also chlorinated rubber or sulpho-chlorinated polyethylene. The new stabilizers can be admixed with the synthetic rubber latex or with rubber solutions and also with the solid rubber or the solid chlorine-containing polymers (for example on a roller). In certain circumstances they can also be admixed with the monomers prior to polymerization. The stabilizers of this invention preferably should be employed in an amount of from 0.1 percent to 10 percent by weight, based on the weight of synthetic polymer. Amounts of stabilizer of from 0.1 percent to 5 percent, and especially from 0.1 percent to 1.5 percent, are particularly preferred. They impart to synthetic rubber and to chlorine-containing polymers excellent stability to oxidizing agents, heat, light and discoloration. At the same time they are compatible with additives, such as plasticizers and fillers.

Accordingly, another aspect of the invention is the preparation of stabilized polymeric compositions comprising a polymer selected from the group consisting of homopolymers of conjugated diolefins, copolymers of conjugated diolefins and polymerizable vinyl monomers, homopolymers of chlorobutadiene, copolymers of chlorobutadiene and a monomer selected from the group consisting of an olefin, a diolefin, vinyl chloride and vinylidene chloride, polyvinyl chloride, polyvinylidene chloride, and chlorinated natural rubber, stabilized by incorporating therein 0.1 percent to 10.0 percent, based on the weight of polymer, of a phosphite of the formula:

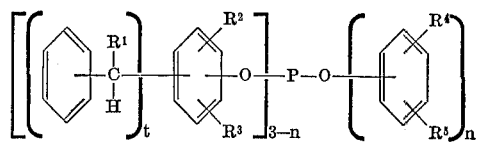

wherein $R^1$ is selected from the group consisting of hydrogen and alkyl $R^2$, $R^3$, $R^4$ and $R^5$ are independently selected from the group consisting of hydrogen, alkyl, and halogen, $n$ is from 1 to 2 and $t$ is from 1 to 3.

Example 6

Each of the additives indicated below was admixed with mixtures of 75 parts of polyvinyl chloride, 33.7 parts of dioctyl phthalate and .375 part of barium-cadmium laurate. Specimens of each mixture were heated in an oven maintained at 170 degrees centigrade.

In each case, 0.375 part of the following additives was present with the polyvinyl chloride mixture:

(a)

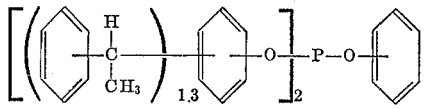

mixture of phenyl bis[(α-methylbenzyl) phenyl] phosphite and phenyl bis[di(α-methylbenzyl) phenyl] phosphite.

(b)

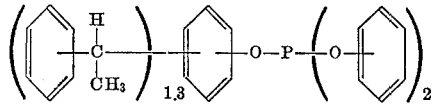

mixture of diphenyl [(α-methylbenzyl) phenyl] phosphite and diphenyl[di(α-methylbenzyl) phenyl] phosphite.

On exposure to heat the following results were obtained:

TABLE I

| Additive | Discoloration after exposure for— | | | | | |
|---|---|---|---|---|---|---|
| | 0.25 hr. | 0.30 hr. | 0.45 hr. | 1 hr. | 1.15 hr. | 1.30 hr. |
| 1 None | Weak | Very strong | | | | |
| 2 (a) | None | Faint | Faint | Weak | Strong | Strong. |
| 3 (b) | do | do | do | do | do | Do. |

When 0.375 part of phenyl bis(4-α-methylbenzylphenyl) phosphite, phenyl bis(2-α-methylbenzylphenyl) phosphite, nonylphenyl bis(2 - α - methylbenzylphenyl) phosphite, phenyl bis[2,4 - di(α - methylbenzyl) phenyl] phosphite, phenyl bis[2,4,6-tri(α-methylbenzyl) phenyl] phosphite, diphenyl 4 - α - methylbenzylphenyl phosphite, dinonylphenyl 2-α-methylbenzylphenyl phosphite, diphenyl 2-α-methylbenzylphenyl phosphite, diphenyl 2,4-di(α-methylbenzyl) phenyl phosphite, dinonylphenyl 2,4,6-tri-(α-methylbenzyl) phenyl phosphite or diphenyl 2,4,6-tri-(α-methylbenzyl) phenyl phosphite is used as the additive, similar results are obtained.

Example 7

150 parts of 1,4-cis-polyisoprene are thoroughly mixed in a kneader with 2,500 parts of cyclohexane and with 7.5 parts of phenyl bis(2-α-methylbenzylphenyl) phosphite, phenyl bis[2,4,6-tri(α-methylbenzyl) phenyl] phosphite, dinonylphenyl 2,4,6 - tri(α - methylbenzyl) phenyl or diphenyl 2,4,6 - tri(α - methylbenzyl) phenyl. The resulting mixture is thoroughly washed with cold water and dried under vacuum at 50 degrees centigrade.

For comparison purposes, 150 parts of 1,4-cis-polyisoprene are treated in the same manner but without the addition of the stabilizer. The two specimens are exposed to air and upon periodic examination the comparison specimen becomes tacky and starts to deliquesce, whereas the stabilized specimen is unchanged.

Example 8

GR–S rubber crumb was prepared by diluting 2,955 parts of unstabilized 1502 rubber latex (mixed rosin and fatty acid, cold butadiene-styrene latex, wherein the rubber hydrocarbon contain 23.5 percent bound styrene) containing approximately 20 percent rubber hydrocarbon with 3,000 parts of water and thereafter adding a solution of 75 parts of sodium chloride dissolved in 700 parts of water to cream the latex. The mixture was heated to and maintained at 49 degrees centigrade, and 3,031 parts of 2 percent sulfuric acid were added in divided portions with stirring. The formed rubber crumb was digested for 15 minutes at 49 degrees C., cooled to room temperature and washed with water until free of chlorine ion, as detected by the silver nitrate test. The rubber crumb was dried to a constant weight employing a circulating oven at 65.5 degrees centigrade.

Example 9

This illustrates the stabilizing properties of the novel phosphites of the invention in synthetic rubber mixtures.

Several different test samples, as shown hereinafter at Table II, were prepared employing mixture of 75 parts of the dried butadiene-styrene crumb of Example 8 and 1.2 parts of a phosphite stabilizer of this invention. Each mixture was milled with blending on an unheated 2 roll mill until uniform quarter inch thick sheets were obtained. Each sheet was cut into strips which were placed into a circulating oven maintained at 130 degrees centigrade. At various intervals, samples of each mixture were withdrawn and checked for resinification and phenolic odor. A control containing no phosphite was also prepared and tested. The results obtained during the testing are shown at Table II appearing below.

TABLE II

| Sample | Stabilizer | Resinification after exposure to 130 degrees centigrade for— | | | |
|---|---|---|---|---|---|
| | | 1 hour | 3 hours | 6 hours | 8 hours |
| 1 | Di(nonylphenyl) 2,4,-di(α-methyl-benzyl) phenyl phosphite. | None | None | Medium | Severe. |
| 2 | Phenyl bis [(α-methyl-benzyl)₁.₃ phenyl] phosphite.* | do | do | Slight | Do. |
| 3 | None | Slight | Severe | | |

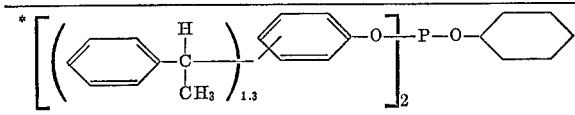

*$$\left[\left(\underset{CH_3}{\underset{|}{\underset{C}{\overset{H}{\overset{|}{—}}}}}\right)_{1.3} \phantom{x} \right]_2 —O—P—O—$$

Additionally, no phenolic odor could be detected. Resinification is defined as the surface cracking of a stretched polymer film previously exposed to heat whereby a melted surface film was produced.

When nonylphenyl bis(4-α-methylbenzylphenyl) phosphite, phenyl bis [2,4-di(α-methylbenzyl) phenyl] phosphite, phenyl bis [2,4,6 - tri(α - methylbenzyl)phenyl] phosphite, diphenyl 4-α-methylbenzylphenyl phosphite, diphenyl 2-α-methylbenzylphenyl phosphite, or diphenyl 2,4,6-tri(α-methylbenzyl)phenyl phosphite is used as the stabilizer in Example 9, results corresponding to those of Table II are obtained.

Further, upon replacement of the butadiene-styrene rubber in Example 9 by a copolymer of chlorobutadiene and monomer selected from the group consisting of an olefin, a diolefin, vinylchloride and vinylidene chloride, results corresponding to those of Table II are obtained.

What is claimed is:

1. A mixed organic phosphite of the formula

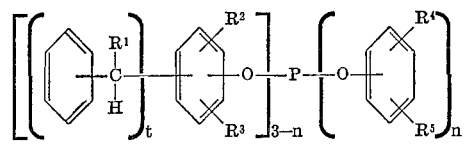

wherein $R^1$ is selected from the group consisting of hydrogen and alkyl, $R^2$, $R^3$, $R^4$ and $R^5$ are independently selected from the group consisting of hydrogen, alkyl, chlorine and bromine $n$ is from 1 to 2, and $t$ is from 1 to 3.

2. A mixed organic phosphite in accordance with claim 1 wherein $n$ is 1.

3. A mixed organic phosphite in accordance with claim 1 wherein $n$ is 2.

4. A mixed organic phosphite in accordance with claim 1 wherein $R^2$, $R^3$, $R^4$ and $R^5$ are hydrogen.

5. A mixed organic phosphite in accordance with claim 4 wherein $t$ is from 1 to 2.

6. A mixed organic phosphite in accordance with claim 4 wherein $t$ is from more than 2 to 3.

7. A compound of the formula

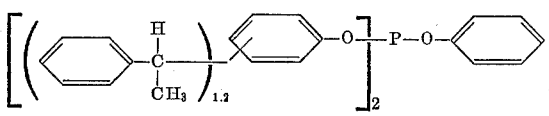

8. Nonylphenyl bis (4-α-methylbenzylphenyl) phosphite.
9. Phenyl bis[2,4-di(α-methylbenzyl)phenyl] phosphite.
10. Phenyl bis[2,4,6-tri(α-methylbenzyl)phenyl]phosphite.
11. Diphenyl 4-α-methylbenzylphenyl phosphite.
12. Diphenyl 2-α-methylbenzylphenyl phosphite.
13. Di(nonylphenyl) 2,4 - di(α - methylbenzyl)phenyl phosphite.
14. Diphenyl 2,4,6 - tri(α-methylbenzyl)phenyl phosphite.

15. A mixed organic phosphite according to claim 1 in which said halogen is chlorine.

References Cited

UNITED STATES PATENTS 2,121,611  6/1938  Salzberg _____ 260—967
3,244,661  4/1966  Kline _____ 260—967 XR

FOREIGN PATENTS 1,319,836  1/1963  France.

CHARLES B. PARKER, *Primary Examiner.*

A. H. SUTTO, *Assistant Examiner.*

U.S. Cl. X.R.

260—976, 457

UNITED STATES PATENT OFFICE
CERTIFICATE OF CORRECTION

Patent No. 3,415,907                      December 10, 1968

James S. Sconce et al.

It is certified that error appears in the above identified patent and that said Letters Patent are hereby corrected as shown below:

Column 1, lines 50 to 55, the formula should appear as shown below:

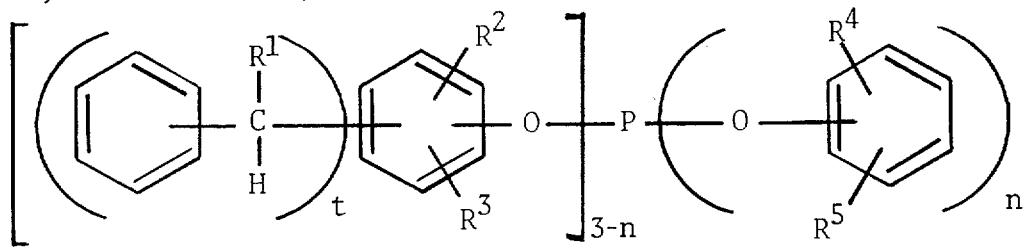

Column 4, lines 31 to 35, the formula should appear as shown below:

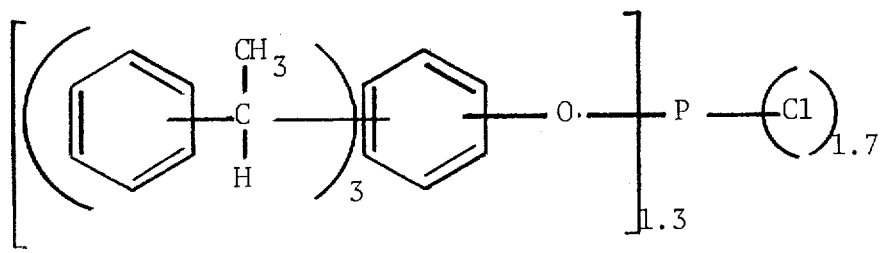

same column 4, line 61, the word after "apparatus" should be corrected to read as -- of --. Column 5, lines 3 to 7, the formula should appear as shown below:

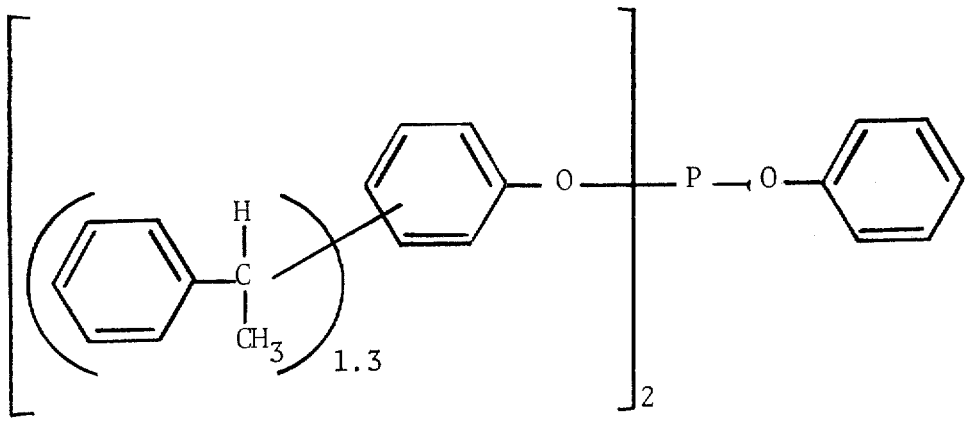

3,415,907

(2)

Column 9, line 5, after the closing parenthesis, the subscript "1.2" should read -- 1.3 --.

Signed and sealed this 2nd day of June 1970.

(SEAL)
Attest:

EDWARD M. FLETCHER, JR.
Attesting Officer

WILLIAM E. SCHUYLER, JR.
Commissioner of Patents